March 18, 1958 J. D. DUNLAP, JR 2,826,854
FISHING LURE
Filed Feb. 4, 1955
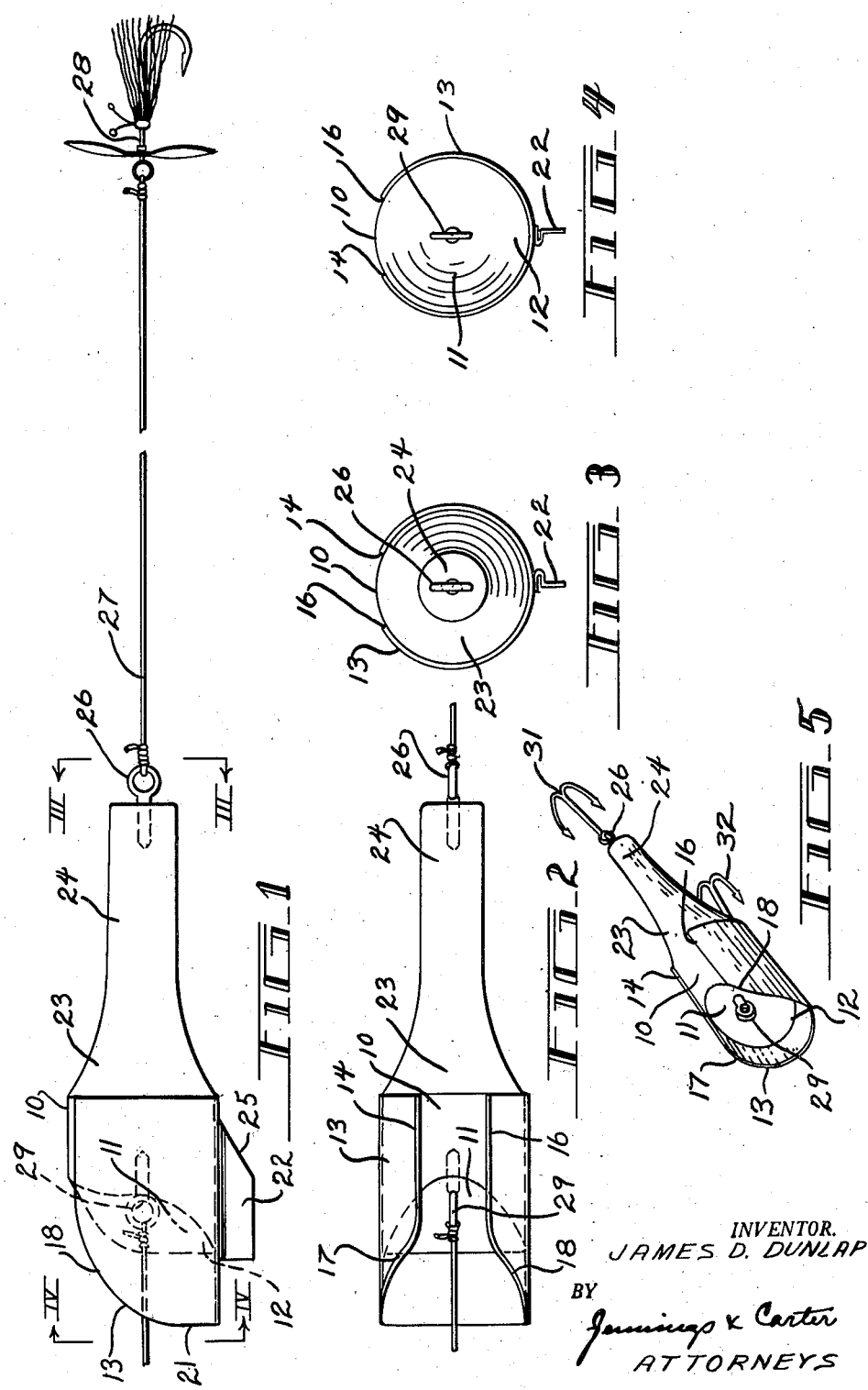
INVENTOR.
JAMES D. DUNLAP JR.
BY
Jennings & Carter
ATTORNEYS

United States Patent Office 2,826,854
Patented Mar. 18, 1958

2,826,854

FISHING LURE

James D. Dunlap, Jr., Birmingham, Ala.

Application February 4, 1955, Serial No. 486,182

1 Claim. (Cl. 43—42.22)

This invention relates to a fishing lure and has for an object the provision of a device of the character designated which shall be especially adapted for casting and trolling and which shall be simple of design and economical of manufacture.

Briefly, my invention includes a generally cylindrical forward body portion, a gradually tapering intermediate portion terminating in a cylindrical rear portion and a cylindrical metal shell member at the front projecting forwardly from the body and open at the top. The sides of the opening of the metal shell taper rearwardly and upwardly and the forward end of the body is hollowed out in a spoon shape and tapered rearwardly so as to provide a diving action when the lure is retrieved. A stabilizing fin is provided on the under side of the forward end of the metal shell which may be bent to provide the desired wobbling motion when the lure is being retrieved and which holds the lure in its proper position in the water as it is being retrieved. The lure may have hooks attached directly to the body or it may be used with a fly trailer with which latter it is especially useful in fishing for striped bass.

A fishing lure embodying features of my invention is illustrated in the accompanying drawing forming a part of this application, in which:

Fig. 1 is a side elevation showing the lure as it is used with a fly trailer;

Fig. 2 is a plan view of the lure;

Fig. 3 is a rear elevational view;

Fig. 4 is a front elevational view; and

Fig. 5 is a perspective view showing hooks attached directly to the lure.

Referring to the drawing my improved lure includes a generally cylindrical forward, or main body portion 10 comprising approximately one-third the length of the body and having its forward end hollowed out at 11 to form a spoon-shaped depression which is inclined upwardly and rearwardly from the lower forward edge 12 of the body portion. Surrounding the main body portion 10 and extending forwardly therefrom for a considerable distance is a cylindrical shell 13 which is open at the top as shown to provide a relatively wide space between opposed edges 14 and 16. The front portion of the edges 14 and 16 is rounded off to incline upwardly and rearwardly as shown at 17 and 18 each beginning at a point slightly below a horizontal plane passing through the longitudinal axis of the cylindrical body and thence along a plane 21 normal to the longitudinal axis of the cylindrical body.

Secured on the underside of the cylindrical shell 13 and extending substantially the length thereof is a bendable stabilizing member or fin 22, which extends downwardly therefrom and serves to hold the lure, while in the water, in the position shown in Fig. 1 of the drawing. The fin 22 tapers rearwardly from its mid-portion as shown at 25. The fin 22, as is well understood, may be bent slightly to provide a wobbling, or side to side motion of the lure as it is being retrieved in the water.

Extending rearwardly from the main body portion 10 for a distance corresponding to approximately one third the length of the body is a tapering intermediate body portion 23 which is cylindrical in shape and which is succeeded by a substantially cylindrical rear body portion 24 for the remaining one third of the length of the body which is considerably smaller in diameter than the body portion 10. Mounted in the rear end of the rear body portion 24 is an eye screw 26 for attachment of hooks or a trailer, as is well understood. In Fig. 1 of the drawing, I show a leader 27 secured in the eye screw 26 which may be of any desired length, and which has attached at the rear a fly 28. The fly 28 may be of any design desired by the fisherman. A second eye screw 29 is attached to the approximate center of the forward end of the main body portion 10 to which the line may be secured.

Instead of the arrangement shown in Fig. 1, my improved lure may have hooks 31 attached to the rear eye screw 26 and other hooks 33 secured to the underside of the main body portion 10, as shown in Fig. 5. Preferably, my improved lure is made of such material that it floats level as shown in the drawing until being retrieved. Upon being retrieved, water enters the forward cylindrical portion formed by the shell 13 and strikes the upwardly and rearwardly inclined spoon-like portion 11 of the forward end of the body portion 10 and causes the lure to dive downwardly in the water. The depth to which the lure runs while being retrieved depends upon the speed of retrieving. As it is being retrieved the stabilizing fin 22 imparts to it a side to side or wobbling motion of the rear end which makes it very attractive to fish.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

A fishing lure comprising a forward cylindrical body portion equivalent to approximately one third the length thereof with its entire forward end hollowed out in a rearwardly and upwardly sloping spoon shape, a cylindrical shell open at the top partially surrounding the forward body portion and extending forwardly therefrom for a considerable distance, with spaced apart sides, said spaced apart sides being sloped downwardly to substantially a horizontal plane passing through the long axis of the lure, a generally tapering intermediate body portion equivalent to approximately one third the length of the body portion, a cylindrical rear portion, and a relatively thin, longitudinally extending stabilizing fin on the underside of said cylindrical shell, said fin being bendable to effect lateral motion to the lure.

References Cited in the file of this patent

UNITED STATES PATENTS

| | | |
|---|---|---|
| 1,188,583 | Townsend | June 27, 1916 |
| 1,321,850 | Rhodes | Nov. 18, 1919 |
| 1,809,776 | Davenport | June 9, 1931 |
| 1,898,740 | Novitzky | Feb. 21, 1933 |
| 2,550,247 | Higgins | Apr. 24, 1951 |
| 2,557,577 | Soma | June 19, 1951 |
| 2,567,728 | Rivero | Sept. 11, 1951 |
| 2,630,648 | Powell | Mar. 10, 1953 |

FOREIGN PATENTS

| | | |
|---|---|---|
| 495,645 | Canada | Sept. 1, 1953 |